US012753640B2

(12) United States Patent
Berres et al.

(10) Patent No.: US 12,753,640 B2
(45) Date of Patent: Oct. 6, 2026

(54) ACTUATOR FOR MOTOR VEHICLE APPLICATIONS

(71) Applicant: KIEKERT AKTIENGESELLSCHAFT, Heiligenhaus (DE)

(72) Inventors: Michael Berres, Cologne (DE); Stefan Adamik, Velbert (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 134 days.

(21) Appl. No.: 18/712,395

(22) PCT Filed: Nov. 16, 2022

(86) PCT No.: PCT/DE2022/100856

§ 371 (c)(1),
(2) Date: May 22, 2024

(87) PCT Pub. No.: WO2023/104238

PCT Pub. Date: Jun. 15, 2023

(65) Prior Publication Data

US 2025/0012119 A1 Jan. 9, 2025

(30) Foreign Application Priority Data

Dec. 7, 2021 (DE) ..................... 10 2021 132 129.8

(51) Int. Cl.
*E05B 77/34* (2014.01)
*E05B 79/02* (2014.01)
(Continued)

(52) U.S. Cl.
CPC .............. *E05B 79/02* (2013.01); *E05B 77/34* (2013.01); *E05B 81/06* (2013.01); *B29C 65/1635* (2013.01)

(58) Field of Classification Search
CPC ..... F16H 2025/209; H02K 5/10; E05B 77/34; E05B 81/06; E05B 81/28; E05B 81/40; E05B 85/02; E05B 79/02; B60J 5/0418
See application file for complete search history.

(56) References Cited

U.S. PATENT DOCUMENTS 4,904,006 A * 2/1990 Hayakawa .............. E05B 81/06 292/216
5,035,454 A * 7/1991 Fukumoto .............. E05B 81/50 292/201

(Continued)

FOREIGN PATENT DOCUMENTS

CN 111827811 A 10/2020
CN 212359413 U 1/2021

(Continued)

OTHER PUBLICATIONS

Espacenet, machine translation of FR 2656030 A1, generated May 12, 2026. (Year: 2026).*

(Continued)

*Primary Examiner* — Kristina R Fulton
*Assistant Examiner* — Emily G. Brown
(74) *Attorney, Agent, or Firm* — Renner, Otto, Boisselle & Sklar

(57) ABSTRACT

An actuator having a housing with a housing shell and at least one housing cover, wherein the housing parts can be connected together over a contact region by means of laser welding; a first sealed chamber in which a drive unit is arranged; and at least one second sealed chamber. A separation of the sealed chambers can be achieved by means of weldable connecting webs in the interior of the housing, and a passage between the chambers can be sealed by a seal in the connecting webs. Different levels of tightness can be formed in the sealed chambers.

12 Claims, 1 Drawing Sheet

(51) Int. Cl.
*E05B 81/06* (2014.01)
*B29C 65/16* (2006.01)

(56) References Cited

U.S. PATENT DOCUMENTS

| | | | | | |
|---|---|---|---|---|---|
| 5,222,774 | A * | 6/1993 | Fukumoto | E05B 81/14 | 292/144 |
| 5,584,515 | A * | 12/1996 | Silye | E05B 81/36 | 292/201 |
| 10,407,041 | B2 * | 9/2019 | Heubner | F16H 63/3441 | |
| 2002/0149283 | A1 * | 10/2002 | Hager | H02K 7/1166 | 310/239 |
| 2010/0126305 | A1 | 5/2010 | Klippert | | |
| 2010/0136818 | A1 * | 6/2010 | Bermel | B29C 65/1664 | 156/272.8 |
| 2012/0222509 | A1 * | 9/2012 | Winther | F16H 25/20 | 74/89 |
| 2013/0015673 | A1 * | 1/2013 | Akizuki | E05B 85/02 | 292/307 R |
| 2013/0154402 | A1 * | 6/2013 | Basavarajappa | H02K 7/06 | 310/20 |
| 2013/0285494 | A1 * | 10/2013 | Iversen | F16H 25/20 | 310/83 |
| 2015/0035300 | A1 * | 2/2015 | Taylor | E05B 9/00 | 74/89 |
| 2016/0153476 | A1 * | 6/2016 | Van Mil | F16F 9/06 | 92/68 |
| 2022/0231580 | A1 * | 7/2022 | Porde | H02K 7/003 | |
| 2024/0017710 | A1 * | 1/2024 | Usui | B01D 46/10 | |

FOREIGN PATENT DOCUMENTS

| | | | | | |
|---|---|---|---|---|---|
| DE | 10259465 | A1 | | 7/2003 | |
| DE | 102007021268 | A1 | | 11/2008 | |
| DE | 102016121187 | A1 | | 5/2018 | |
| FR | 2656030 | A1 | * | 6/1991 | E05B 81/54 |
| GB | 2536721 | A | | 9/2016 | |
| JP | 2001509559 | A | * | 7/2001 | E05B 81/25 |
| KR | 100318326 | B1 | * | 12/2001 | E05B 77/34 |
| WO | WO-2012159595 | A2 | * | 11/2012 | E05B 81/18 |

OTHER PUBLICATIONS

International Search Report mailed Feb. 13, 2023, for priority International Application No. PCT/DE2022/100856.

* cited by examiner

ACTUATOR FOR MOTOR VEHICLE APPLICATIONS

This application is a national phase of International Patent Application No. PCT/DE2022/100856 filed Nov. 16, 2022, which claims priority to German Patent Application No. 10 2021 132 129.8 filed Dec. 7, 2021, each of which is hereby incorporated herein by reference in its entirety.

FIELD OF DISCLOSURE

The invention relates to an actuator having a housing with a housing shell and at least one housing cover, it being possible for the housing parts to be connected together over a contact region by means of laser welding, a first chamber in which a drive unit is arranged, and at least one second chamber, it being possible for a separation of the chambers to be achieved by means of closable connecting webs in an interior of the housing, and it being possible for a passage between the chambers to be sealed by a seal in the connecting webs.

BACKGROUND OF DISCLOSURE

Actuators are used in motor vehicles where actuating movements or locking mechanisms are required, a tank locking mechanism, a charging plug locking mechanism or the positioning of a flap element being mentioned by way of example. This list is of course not restrictive, but merely shows the wide range of applications for an actuating element in a motor vehicle. Electric drives having an actuating element are usually used where comfort functions are to be increased or the vehicle needs to be secured. The actuator can be used, for example, to lock a fuel filler flap or a charging plug in a hybrid or electric vehicle. In this case, the actuating element that can be extended from or retracted into the actuator housing is used, for example, to serve directly as a latch or to actuate a latching element in such a manner that, for example, opening of a fuel filler flap can be prevented.

In this case, depending on how the actuator is used in the motor vehicle, the actuator may be exposed to external weather conditions and must be protected from moisture in particular. If the actuator is used, for example, in a loading flap of an electric vehicle or in the region of a fuel filler flap, the actuator can be used to lock the flap and/or open the flap. In any case, this region must be protected against the ingress of environmental influences such as rain, snow or dust, so that tight sealing of the actuator housing, but also of the actuator itself, must be ensured. Sealing with regard to environmental influences requires that the functional components in contact with the actuator, such as the motor and transmission, must be sealed in the actuator. In this case, the tight fastening of the actuator element in the actuator can impair the functioning of the actuator element, as pressure differences occur in the actuator element due to the movement of the actuator element and/or other sealing means. These pressure differences can impair the function of the actuator element, i.e. the back and forth movement.

DE 10 2007 021 268 A1 discloses an adjustment unit for a motor vehicle having at least two housing parts welded together. A second housing part in the form of a housing cover is placed on a first housing part and then the housing parts are connected by means of laser welding. Connecting webs can be provided inside the housing, which webs divide the housing into different chambers. The connecting webs can also be connected to the housing cover, so that different chambers can be created in the housing for different requirements. The sub-chambers of the housing are then suitable for accommodating different functional components.

Dividing the housing into different sub-chambers offers the advantage that, for example, moisture-sensitive components can be arranged in the housing separately from components provided with lubricants. By connecting the housing parts using laser welding, a tight connection can be established. Depending on the field of application and use of the housing, however, tightly sealed chambers may have disadvantages in terms of the functionality of the drives. In particular, sealed chambers can lead to moisture settling inside the housing, as the housings can be exposed to significant temperature fluctuations from −40° C. to +80° C. An actuator for overcoming this obstacle is known from DE 102 59 465 A1. The publication discloses an actuator for motor vehicle applications, having an actuating element, an electric motor and a transmission connected downstream of the electric motor, it being possible for the actuating element to be moved into and out of the housing of the actuating element. In this case, the actuating element itself is accommodated in a bellows, the bellows sealing the actuating element in relation to the housing. In order to now protect the actuator's functional components from moisture, an air-permeable but moisture-impermeable membrane is arranged in the housing. The membrane consists of a semi-permeable plastics material, such as PTFE. The semi-permeable layer is supported and held by a load-bearing layer made of a carrier material, also made of plastics material. Polyamide (PA) is usually used here, it being possible for both layers to be connected together using an adhesive.

The above-mentioned techniques have proven themselves in principle, but reach their limits when, for example, absolute tightness has disadvantages and openings in the housing can lead to moisture ingress. The known solutions are not fully convincing in all cases. This is where the invention starts.

SUMMARY OF DISCLOSURE

The object of the invention is to provide an improved actuator. In particular, the object of the invention is to provide a way of accommodating the functional components individually in the housing according to their requirements. In addition, the object of the invention is to provide a structurally simple and cost-effective solution for accommodating the functional groups in the actuator.

The object is achieved according to the invention by the features of independent claim 1. Advantageous embodiments are specified in the dependent claims. It should be noted, however, that the embodiments described below are not limiting; rather, any possible variations of the features described in the description, the claims and the drawings are possible.

According to claim 1, the object of the invention is achieved in that an actuator is provided, having a housing with a housing shell and at least one housing cover, it being possible for the housing parts to be connected together over a contact region by means of laser welding, a first chamber in which a drive unit is arranged, and at least one second chamber, it being possible for a separation of the chambers to be achieved by means of weldable connecting webs in an interior of the housing, and it being possible for a passage between the chambers to be sealed by a seal in the connecting webs, it being possible for different tightness levels to be formed in the chambers. By virtue of the design of the actuator according to the invention, the chambers present in the actuator can be adapted to the functional assemblies. In particular, it is possible to design the chamber to be fully sealed, for example to prevent lubricants from escaping from the chamber. Another chamber for example may require less tightness, for example if air circulation is advantageous for the function of the functional assembly. The design according to the invention of the actuator, having different tightness levels, thus means that the function of the functional assemblies can be taken into account. In particular, advantageous tightness levels can be set, and thus the functionality and durability of the actuator can be increased.

The actuator according to the invention can be used wherever, for example, a locking mechanism is required in a motor vehicle. Such locking mechanisms may be necessary and/or helpful on glove compartments, flaps or covers, fuel filler caps and/or charging plugs, for example. The actuator is therefore used to lock and thus secure the position of the locked component. However, actuators can also be used where, for example, it is necessary to position components such as a side door of a motor vehicle or a flap. In this case, an actuating means is moved by the actuator in such a manner that a locking, positioning and/or erecting of a component that is movably attached to the motor vehicle is to be positioned and/or secured.

The actuator has a housing that protects the components inside the actuator from environmental influences. Environmental influences can be, for example, moisture, rain, lubricants and/or dust, which can limit the functionality of the functional assemblies. Thus, for example, electrical and/or electronic components must be protected against moisture ingress, as this can damage the electrical and/or electronic components. In addition, lubricants present in the motor vehicle can also enter the actuator and thus impair the function of contacts in the actuator, for example.

The housing therefore on the one hand has the function of protecting the functional assemblies from environmental influences, and on the other hand the housing can be used to directly accommodate and/or store the functional assemblies. Preferably, the housing consists of a housing shell and one or more housing covers. A plurality of housing parts can also be assembled to form a housing shell, which can then be connected to one or more housing covers. In any case, the housing parts have contact regions that are in contact with one another in such a manner that there is gapless contact in the joined state. In addition, the housing parts must be designed to be suitable for laser welding, as described in the prior art, for example DE 10 2007 021 268 A1. In other words, there must be translucent and opaque contact regions that allow the housing parts to be welded together.

In any case, the actuator has a first chamber in which a drive unit is arranged. In this case, the drive unit can consist of an electric motor having a downstream transmission and an actuating means. Depending on the requirements of the actuator, a plurality of motors and transmissions can of course also be present, which engage with levers, linkages and/or other actuating means. The first chamber comprising the drive unit can preferably be designed as a drive chamber, in that lubricants are also used in order to ensure friction-optimized and noise-optimized cooperation between the transmission partners. The first chamber must be protected against the ingress of dust and/or moisture, as this can affect the functionality of the drive.

At least one second chamber is provided in the actuator, in which chamber an actuating means is arranged, the actuating means being movable out of the chamber. However, the second chamber may also contain a control board or an electrical or electronic component, for example, so that different requirements are placed on this chamber in terms of tightness. However, if the second chamber is equipped with an actuating means, for example, which can be moved out of the chamber, pressure differences can be generated in the actuator by the actuating movements. If the actuating means is sealed in the housing, a vacuum that occurs when the actuating means moves out can impair the functionality of the actuating means and also affect the drive. An actuating means that is moved out of the actuator under negative pressure can cause a higher energy requirement in the drive unit, which in turn can result in higher temperatures in the drive unit, the speed of the actuating means can be impaired, and the negative pressure can have a negative effect on the tightness of the actuator. High negative pressures can also lead to an unwanted exchange of air between the chambers and/or the ambient air, which in turn can allow moisture and/or dirt to enter the chambers. All these disadvantages can be prevented by creating different levels of tightness in the chambers. According to the invention, it is therefore conceivable to provide a high level of tightness in the region of the drive unit and the electrical and/or electronic components, which completely prevents air exchange with the environment and, at the same time, to set a deliberately low level of tightness in the region of the actuating means which can be moved into and out of the housing, which prevents the formation of negative pressure in the actuating means chamber.

In this case, it is advantageous if the actuating means is guided in a sealing manner in the housing, in particular in the housing shell. The actuating means can be guided out of the chamber, the housing providing a guide for the actuating means. In addition, a seal can be arranged on the actuating means, which seal engages with the housing and enables the actuating means to move in a sealed manner. In addition, it is of course also conceivable that a seal is arranged in the housing itself, through which seal the actuating means moves. In an advantageous manner, two seals can also be arranged on the actuating means, a first sealing means being arranged in the housing and the actuating means moving through the seal, and a second sealing means being attached to the housing and being movably engaged with the actuating means. A sealing means that allows the actuating means to move can be designed as a bellows, for example.

In order to be able to provide an advantageous embodiment of the invention, the chamber associated with the actuating means, preferably a second chamber, can have a lower level of tightness than the first chamber in which the drive unit is arranged. The actuating means moves out of the housing and thus, in conjunction with the sealing bellows, increases the volume of the associated chamber in the actuator. If the actuating means chamber is now designed having a lower level of tightness, pressure equalization can take place in the actuating means chamber, allowing the actuating means to move freely. In addition, the drive cannot be overloaded, as a uniform actuating force is required to move the actuating means. The actuating means itself can be made of plastics material, for example, so that air circulation due to the reduced tightness has no significant influence on the functionality of the actuating means, even in the long term.

If the chamber associated with the actuating means, preferably a second chamber, has a spindle drive, another advantageous variant of the invention can be achieved. The advantage of a spindle drive is that very fast and precise actuating movements can be realized thereby. In particular in a combination consisting of a drive unit as a worm gear wheel stage in combination with the spindle drive, the high speeds of the electric drive can be converted into precise and fast movements of the actuating means. In addition, the spindle drive also offers the possibility of providing greater actuating forces, for example for positioning a component that is movably arranged on the vehicle. Spindle drives are also maintenance-free and subject to little wear over long periods of time.

It can also be advantageous if the chamber associated with the actuating means has an opening, in particular a drainage opening. If laser welding can be used to create a high level of tightness between the housing cover and the housing shell, it can be advantageous if the tightness can be specifically influenced by an opening in a functional space. This can also be referred to as a primary tightness level and a secondary tightness level. In this case, a primary tightness level can have a higher tightness and, for example, can have electrical or electrotechnical components and/or include, for example, a drive stage and/or the drive unit. The secondary tightness level, which may be located in the second chamber, for example, may also contain the actuating means and have a secondary tightness level for providing durability and high functionality. In an advantageous manner, for this purpose either the tightness can be achieved by interrupting the weld seam between the cover and the housing shell, and/or there can be one or more openings in the housing or housing cover so that pressure equalization can be achieved in the actuating means chamber. Partial welding of the housing cover in the region of the second sealing chamber, which is assigned to the actuating means, can increase the functionality of the actuating means and protect the other components of the actuator.

In an advantageous manner, the opening can be closed by means of a semi-permeable element. The arrangement of a semi-permeable element can be used to allow air exchange into the chamber of the actuating means, but prevent moisture from entering the chamber. This allows the pressure to equalize without allowing moisture to penetrate the chamber.

As described above, the opening in the housing containing the actuating means or the associated chamber can be created by an interruption of the weld seam. In this case, one or more interruptions can be provided in the weld seam, so that different levels of tightness can be provided or produced depending on the requirements of the actuating means. In addition to the interruption of the weld seam, a combination of a geometric opening in the housing and an interruption of the weld seam can also lead to different levels of tightness.

In this case, the formation of different sealing chambers in the actuator can have a significant influence on the functionality of the actuator. In particular, a durability of the actuator can be achieved while maintaining the same functionality, it being possible at the same time for negative influences caused by the generation of negative pressures to be eliminated.

BRIEF DESCRIPTION OF DRAWINGS

In the following, the invention is explained in more detail with reference to the appended drawings using an embodiment. However, the principle applies that the embodiment does not limit the invention, but is merely an advantageous embodiment. The features depicted can be implemented individually or in combination with further features of the description as well as what is claimed-individually or in combination.

In the figures.

DETAILED DESCRIPTION

Figure 1:
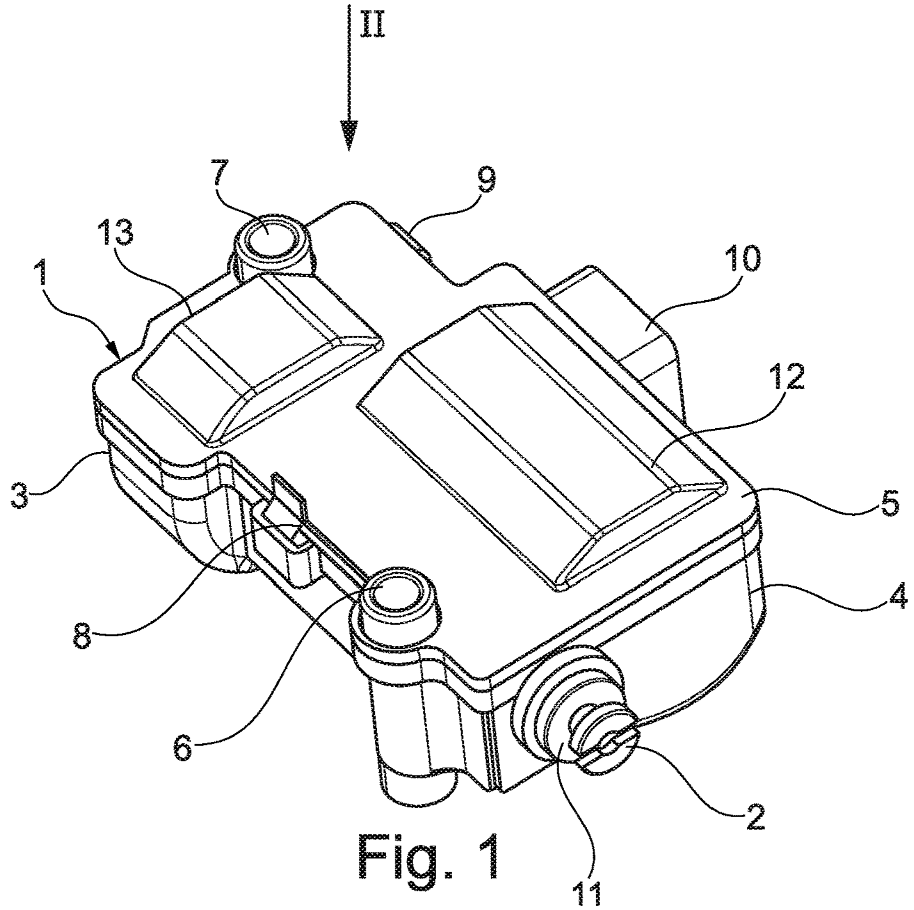
FIG. 1 shows a three-dimensional view of an actuator comprising a connection socket and an actuating means retracted into the housing.

FIG. 1 is a three-dimensional view of an actuator 1 having a retracted actuating means 2. In this embodiment, a housing 3 is formed of a housing shell 4 and a housing cover 5. For easier installation of the actuator 1 and/or to secure the position of the housing cover 5 on the housing shell 4, the housing cover 5 can be positioned and held on the housing shell 4 by screwing it over the openings 6, 7 in the housing cover 5 and/or by means of a clip connection 8, 9. A plug socket 10 is also integrally formed on the housing shell 4 so that the actuator 1 can be electrically contacted in a motor vehicle.

The illustrated actuator 1 can be used, for example, to lock a fuel filler flap, to lock a charging plug on a charging socket, to lock a cover, to position a component movably arranged on the motor vehicle, etc. The actuator 1 can therefore be used in a variety of ways in the motor vehicle, the actuator preferably being suitable for use under environmental influences due to its tightness.

Figure 2:
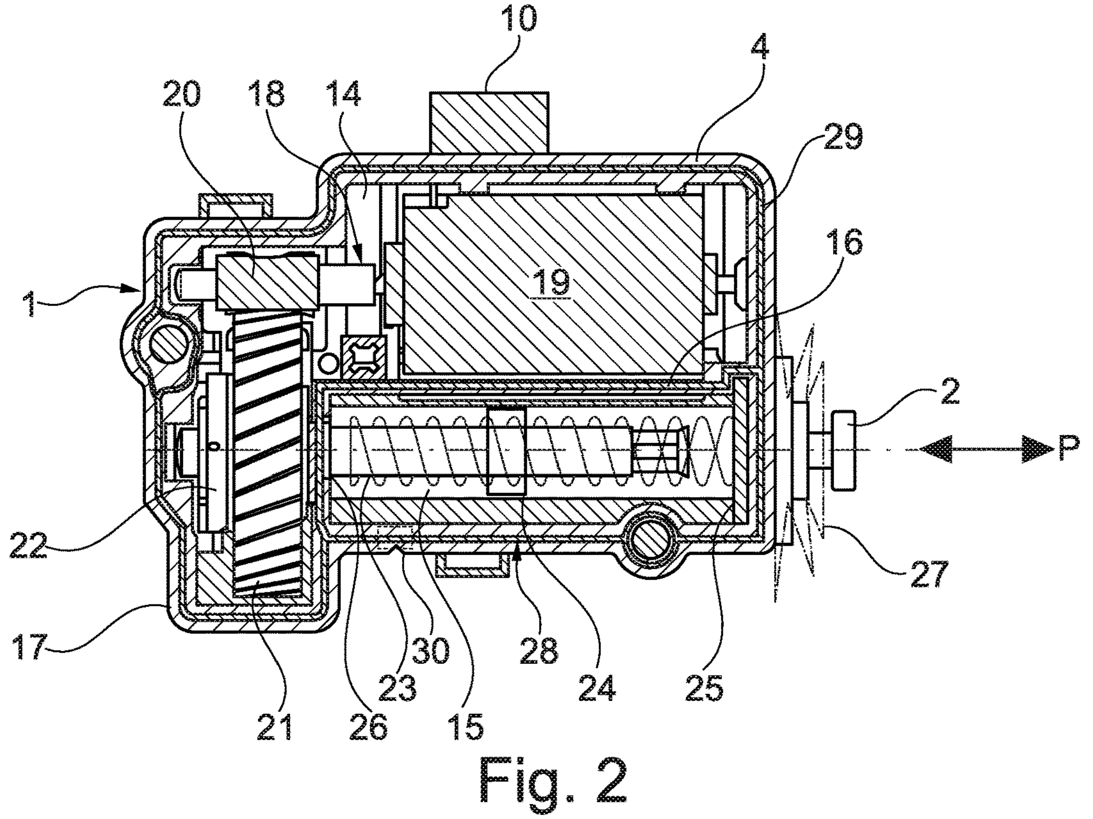
FIG. 2 shows a plan view of the actuating means shown in FIG. 1 without a housing cover, comprising two chambers of different levels of tightness.

In this embodiment, the actuating means 2 is moved out of and back into the housing shell 4 by a guide and/or sealing element 11. FIG. 1 shows the actuating means 2 moved into the housing 3. The screws to be inserted into the openings 6, 7 for screwing the housing 3 are not shown. The housing cover 5 also has elevations, below which the functional components of the actuator 1 are arranged. FIG. 2 is a plan view of the actuator 1 viewed from the direction of arrow 1 in FIG. 1, the actuator 1 being shown without the housing cover 5, so that the different chambers 14, 15 are visible. The chambers 14, 15 are separated and formed by a connecting web 16 inside the housing shell 4. A peripheral contact surface 17 can be seen on the housing shell 4, onto which the housing cover 5 can be placed flat. In order to enable laser welding of the housing cover 5 to the contact surface, the housing cover 5 is placed on the housing shell 4 without any gaps. In this case, the housing cover rests peripherally on the contact surface 17 as well as on the connecting web 16.

A drive unit 18 consisting of a motor 19, a worm 20 arranged on the output shaft of the motor, a worm gear wheel 21 and a resetting means 22 is arranged inside the housing 3 in the first, primary chamber 14.

This primary chamber provides a higher level of tightness and contains the drive unit 18 described above. The second or secondary chamber 15 formed by the connecting web 16 has a level of tightness having a lower tightness. The spindle drive 23, 24 for actuating the actuating means 2 is only shown and indicated in some regions. An additional guide and/or sealing element 25 is arranged in the secondary sealing chamber 15 on the output side of the actuating means 2. The drive force is transmitted from the drive unit 18 to the spindle drive 23, 24 via a through-opening 26, which is preferably in turn provided with a sealing element and arranged in the connecting web 16. A bellows 27 is arranged on the housing shell 4 and the actuating means 2, in order to further ensure tightness for actuating the actuating means 2.

If the actuating means 2 is now intended to be moved out of the housing 3 of the actuator 1 in the direction of the arrow P, a signal is sent to the electric motor 19 via the plug socket 10, as a result of which the worm drive 20, 21 is acted upon and the actuating means 2 can be moved in the direction of arrow P with the aid of the spindle drive 23, 24. When the actuating means 2 is moved, the volume of the secondary sealing level, which is also formed by the volume of the bellows 27, changes. If the secondary chamber 15 now has a lower level tightness, pressure equalization can take place in the secondary tightness level 15. In order to reduce the tightness, for example an interruption 28 can be made in the peripheral laser weld 29, or a recess, for example of a hole 30, can be made in the housing shell 4. This means that a lower tightness can be achieved in the secondary sealing chamber 15. The recess then forms a drainage hole 30 for the secondary sealing chamber 15. Due to the lower tightness, the secondary tightness level 15 preferably does not contain any metal and/or electrical components, since moisture can enter the secondary sealing chamber 15 due to the movement of the actuating means 2 or the slide 2, or also through the interruption 28 or the drainage hole 30.

The tightness in the actuator 1 can thus be adjusted in an advantageous manner, so that the functional units 18, 23, 24 can be designed adaptably with regard to their requirements.

LIST OF REFERENCE NUMBERS

1 Actuator
2 Actuating means
3 Housing
4 Housing shell
5 Housing cover
6, 7 Opening
8, 9 Clip connection
10 Plug socket
11, 25 Guide and/or sealing element
12, 13 Elevation
14, 15 Primary, secondary sealed chamber
16 Connecting web
17 Contact surface
18 Drive unit
19 Electric motor
20 Worm
21 Worm gear wheel
22 Resetting means
23, 24 Spindle drive
26 Through-opening
27 Bellows
28 Interruption
29 Laser seam
30 Drainage hole
P Arrow

The invention claimed is:

1. An actuator comprising:

a housing with a housing shell and at least one housing cover, the housing shell and the at least one housing cover being configured to be connected together over a contact region by laser welding, the housing shell defining a first chamber in which a drive unit is arranged, and a second chamber in which an actuating means is arranged, weldable connecting webs positioned in an interior of the housing shell, the first chamber and the second chamber being configured for a separation of the first and second chambers to be achieved by the weldable connecting webs, and a passage between the first and second chambers sealed by a seal in the connecting webs such that the first chamber is sealed with respect to the second chamber, wherein different levels of tightness are formed in the first chamber versus the second, wherein the drive unit arranged in the first chamber comprises a motor, a worm, a worm gear wheel, and a resetting means, wherein the actuating means is moved out of the second chamber, and further comprising at least one actuator seal, wherein the actuating means is guided in a sealing manner in the housing via the at least one actuator seal.

2. The actuator according to claim 1, wherein the second chamber has a lower tightness level than the first chamber.

3. The actuator according to claim 2, wherein components of the actuator made of plastic materials are arranged in the second chamber having the lower tightness level.

4. The actuator according to claim 2, wherein the second chamber that includes the actuating means has a spindle drive.

5. The actuator according to claim 2, wherein the second chamber that includes the actuating means has an opening.

6. The actuator according to claim 2, wherein the housing shell includes a bellows that changes volume for equalizing pressure in the second chamber.

7. The actuator according to claim 5, wherein the opening is closed by a semi-permeable element that allows air exchange into and out of the second chamber for pressure equalization but is impermeable to moisture.

8. The actuator according to claim 1, wherein the tightness level is established by an interruption of a weld seam.

9. The actuator according to claim 1, wherein the actuating means is guided in the housing shell.

10. The actuator according to claim 1, wherein the at least one actuator seal includes a first actuator seal arranged in the housing and the actuating means moves through the first actuator seal, and a second actuator seal attached to the housing and that is movably engaged with the actuating means.

11. An actuator comprising:

a housing with a housing shell and at least one housing cover, the housing shell and the at least one housing cover being configured to be connected together over a contact region by laser welding, the housing shell defining a first chamber in which a drive unit is arranged, and a second chamber in which an actuating means is arranged, weldable connecting webs positioned in an interior of the housing shell, the first chamber and the second chamber being configured for a separation of the first and second chambers to be achieved by the weldable connecting webs, and a passage between the first and second chambers sealed by a seal in the connecting webs such that the first chamber is sealed with respect to the second chamber, wherein different levels of tightness are formed in the first chamber versus the second, wherein the drive unit arranged in the first chamber comprises a motor, a worm, a worm gear wheel, and a resetting means, and wherein the tightness level is established by an interruption of a weld seam.

12. An actuator comprising:

a housing with a housing shell and at least one housing cover, the housing shell and the at least one housing cover being configured to be connected together over a contact region by laser welding, the housing shell defining a first chamber in which a drive unit is arranged, and a second chamber in which an actuating means is arranged, weldable connecting webs positioned in an interior of the housing shell, the first chamber and the second chamber being configured for a separation of the first and second chambers to be achieved by the weldable connecting webs, and a passage between the first and second chambers sealed by a seal in the connecting webs such that the first chamber is sealed with respect to the second chamber, wherein different levels of tightness are formed in the first chamber versus the second, wherein the drive unit arranged in the first chamber comprises a motor, a worm, a worm gear wheel, and a resetting means, wherein the actuating means is moved out of the second chamber, wherein the second chamber has a lower tightness level than the first chamber, and wherein the second chamber that includes the actuating means has a spindle drive.

* * * * *